United States Patent [19]
Chisholm et al.

[11] Patent Number: 5,701,003
[45] Date of Patent: Dec. 23, 1997

[54] INTENSITY COMPENSATED SCANNING SYSTEM

[75] Inventors: Thomas J. Chisholm, Milton, Mass.; Gary Richard, Lincoln, R.I.; Alexander Rysin, Stoughton, Mass.

[73] Assignee: Computer Identics Corporation, Canton, Mass.

[21] Appl. No.: 735,421

[22] Filed: Oct. 22, 1996

[51] Int. Cl.[6] ................................................. G01J 1/32
[52] U.S. Cl. ...................... 250/205; 250/234; 250/566; 358/475
[58] Field of Search ..................................... 250/205, 234, 250/235, 566; 235/462, 472, 467; 382/313; 358/475, 463, 473, 474, 487

[56] References Cited

U.S. PATENT DOCUMENTS

| | | | |
|---|---|---|---|
| 4,689,482 | 8/1987 | Horikawa et al. | 250/205 |
| 4,894,524 | 1/1990 | Murase et al. | 250/205 |
| 4,933,538 | 6/1990 | Heiman et al. | 235/462 |
| 5,028,772 | 7/1991 | Lapinski et al. | 235/467 |
| 5,105,077 | 4/1992 | Asada | 250/205 |
| 5,124,538 | 6/1992 | Lapinski et al. | 235/467 |
| 5,151,586 | 9/1992 | Sato et al. | 250/205 |
| 5,168,148 | 12/1992 | Giebel et al. | 235/462 |
| 5,170,277 | 12/1992 | Bard et al. | 359/210 |
| 5,225,850 | 7/1993 | Egawa et al. | 250/205 |
| 5,229,591 | 7/1993 | Heiman et al. | 235/472 |
| 5,250,791 | 10/1993 | Heiman et al. | 235/472 |
| 5,369,272 | 11/1994 | Eguchi | 250/235 |
| 5,412,501 | 5/1995 | Fisli | 359/286 |
| 5,451,765 | 9/1995 | Gerber | 250/205 |
| 5,459,310 | 10/1995 | He et al. | 250/205 |
| 5,466,921 | 11/1995 | Lapinski et al. | 235/462 |

*Primary Examiner*—Que Le
*Attorney, Agent, or Firm*—Iandiorio & Teska

[57] ABSTRACT

An intensity compensated scanning system includes laser means for providing a laser beam; scanner means for sweeping the laser beam in an arcuate path across a surface to be scanned; means for sensing the return laser beam reflected from the surface to be scanned; means for quantifying the decrease in the intensity of the return laser beam at the scan extremity portion relative to the intermediate scan portion; and means responsive to the means for quantifying for varying the power to the laser means at the scan extremity portion relative to that at the intermediate scan portion for balancing the intensity of the return laser beam reflected from the surface to the means for sensing.

6 Claims, 7 Drawing Sheets

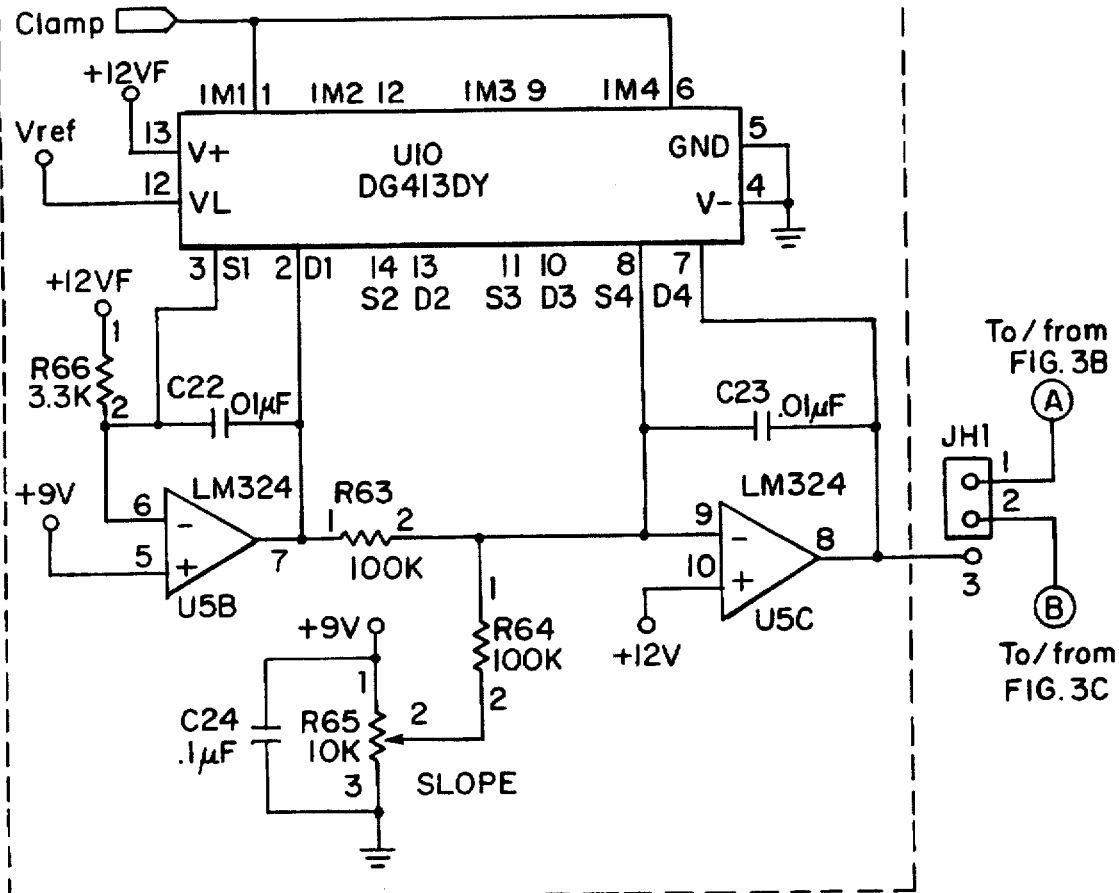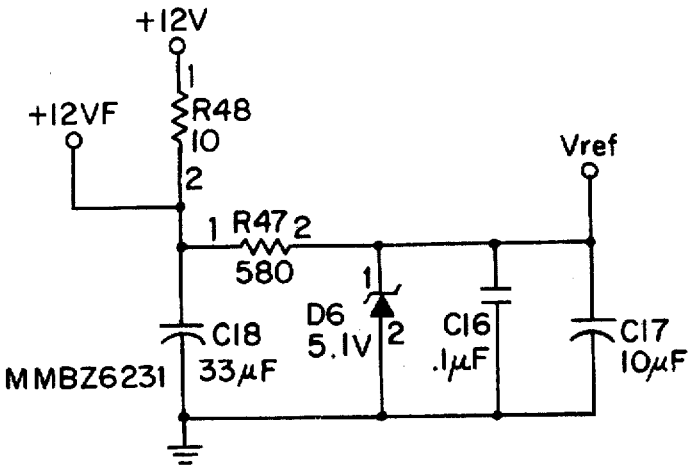
FIG. 3A

INTENSITY COMPENSATED SCANNING SYSTEM

FIELD OF INVENTION

This invention relates to an intensity compensated scanning system, and more particularly to such a system which balances or makes more uniform the intensity of the return laser beam reflected from the surface of an object being scanned.

BACKGROUND OF INVENTION

In a flying spot scanner, the scanned beam is produced by a rotating wheel or oscillating mirror. As the scanned beam moves farther and further away from the perpendicular less and less reflected light is returned to the system. Some systems just deal with this as the natural limit of the system. Others have dealt with fast response AGC (automatic gain control) circuits to compensate for the loss of signal by increasing the gain of the electronics. This approach, however, increases the noise and decreases the bandwidth of the electronic circuits. This is a particular problem with respect to barcode scanners. Typically in conventional barcode readers the ability to read the barcode falls off rapidly beyond the intermediate scan portion toward the extreme portion. This limits the field of view and the depth of field over which barcodes can be reliably read and results in a smaller performance area and shorter scan path available for reading barcodes.

SUMMARY OF INVENTION

It is therefore an object of this invention to provide an improved intensity compensated scanning system.

It is a further object of this invention to provide such an improved intensity compensated scanning system which has an enhanced performance area.

It is a further object of this invention to provide such an improved intensity compensated scanning system which has improved signal to noise ratio and improved signal strength.

It is a further object of this invention to provide such an improved intensity compensated scanning system which does not decrease bandwidth.

It is a further object of this invention to provide such an improved intensity compensated scanning system which extends the depth of field and field of view.

It is a further object of this invention to provide such an improved intensity compensated scanning system which enables reliable reading of barcodes at scan extremes as well as at intermediate scan portions.

It is a further object of this invention to provide such an improved intensity compensated scanning system which makes more uniform over the entire scan path the intensity of the return beam reflected from a surface to be read.

The invention results from the realization that an improved intensity compensated scanning system having an enhanced, enlarged performance area enabling more reliable reading of barcodes and other indicia over the full scan path at the extreme as well as intermediate scan portions can be achieved by quantifying the decrease in intensity of the return laser beam reflected from a surface to be read and applying that identifiable decrease to increase the power to the laser accordingly and vary the intensity of the scanning beam to make the return beam more nearly uniform over the full extent of its path including the extreme as well as intermediate portion.

This invention features an intensity compensated scanning system including laser means for providing a laser beam; scanner means for sweeping the laser beam in an arcuate path across a surface to be scanned. There are means for sensing the return laser beam reflected from the surface to be scanned and means for quantifying the decrease in the intensity of the return laser beam at the scan extremity portion relative to the intermediate scan portion. Means responsive to the means for quantifying vary the power to the laser means at the scan extremity portion relative to that at the intermediate scan portion for balancing the intensity of the return laser beam reflected from the surface to the means for sensing.

In a preferred embodiment the laser means may be a laser diode. The scanner means may include a radial polygonal mirror or a galvanometer mirror. The means for quantifying may include storage means for storing correction data for compensating for the difference in intensity of reflection between the extreme and intermediate portions of the scan. The means for varying may include an amplifier means.

BRIEF DESCRIPTION OF THE DRAWINGS

Other objects, features and advantages will occur to those skilled in the art from the following description of a preferred embodiment and the accompanying drawings, in which:

FIGS. 3A–D are a detailed circuit diagram of the system of FIGS. 1 and 2; and

DETAILED DESCRIPTION OF THE PREFERRED EMBODIMENTS

Figure 1:
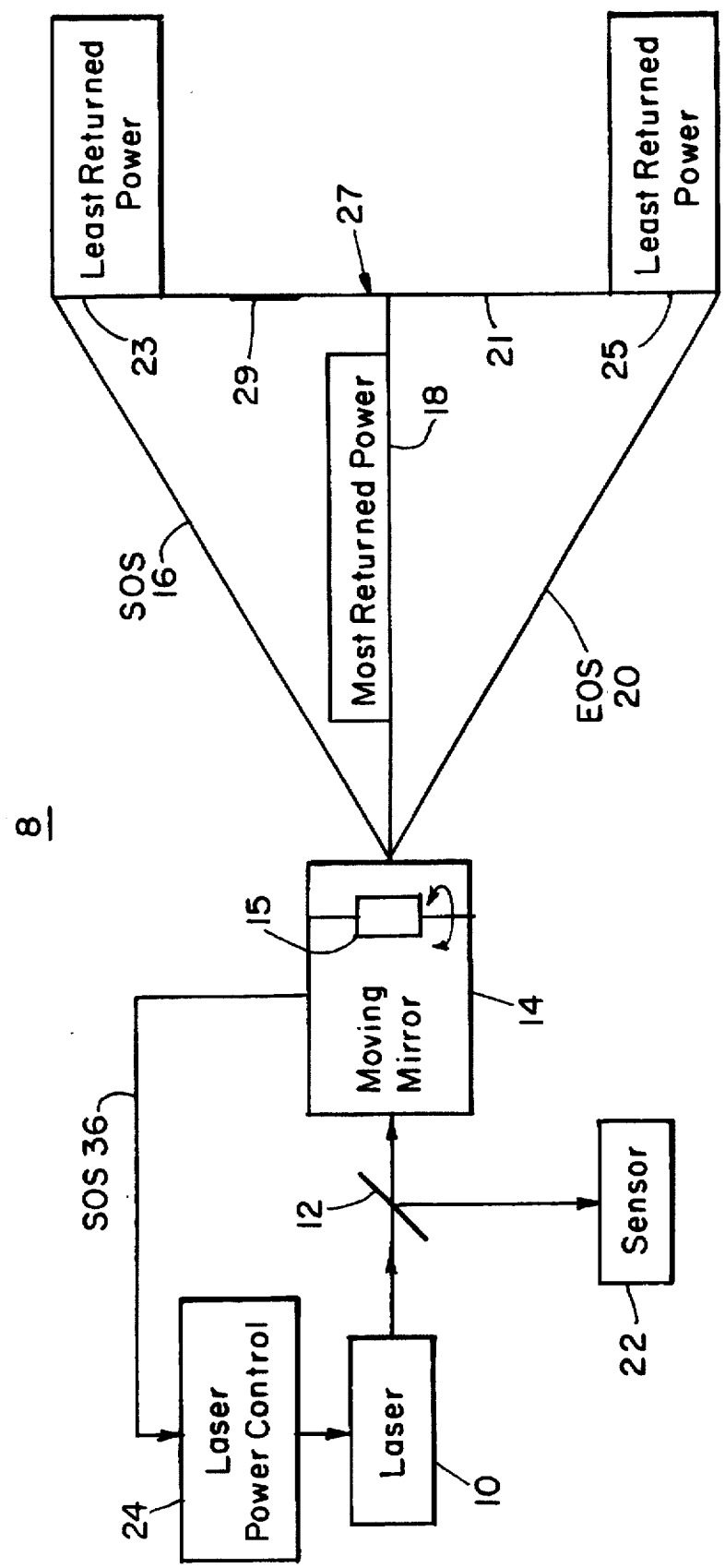
FIG. 1 is a schematic block diagram of an intensity compensated scanning system according to this invention.

There is shown in FIG. 1 an intensity compensated scanning system 8 according to this invention which includes laser 10 that provides a laser beam to moving mirror 14 which may be implemented by a galvanometer driven mirror 15 for example. The beam sweeps from the start of scan position 16 to the end of scan position 20. The surface being scanned 21 returns the least power at the extreme portions 23 and 25 at the start of scan and end of scan, and the most power in the intermediate portion 27. The laser beam passes directly through beamsplitter mirror 12 to the moving mirror mechanism 14. The return beam reflects from beamsplitter 12 and is directed to sensor 22 which senses the incoming beam to read the barcode 29 on surface 21. Laser 10 in accordance with this invention is driven to provide a variable output intensity beam by means of laser power control 24. Laser power control 24 drives laser 10 to provide a more powerful or higher intensity beam in the extreme portions 23 and 25 of the scan and less intense beam at the intermediate portion 27. When laser power control 24 senses the start of scan signal from moving mirror 14 it provides a programmed response to vary the power of laser 10.

Figure 2:
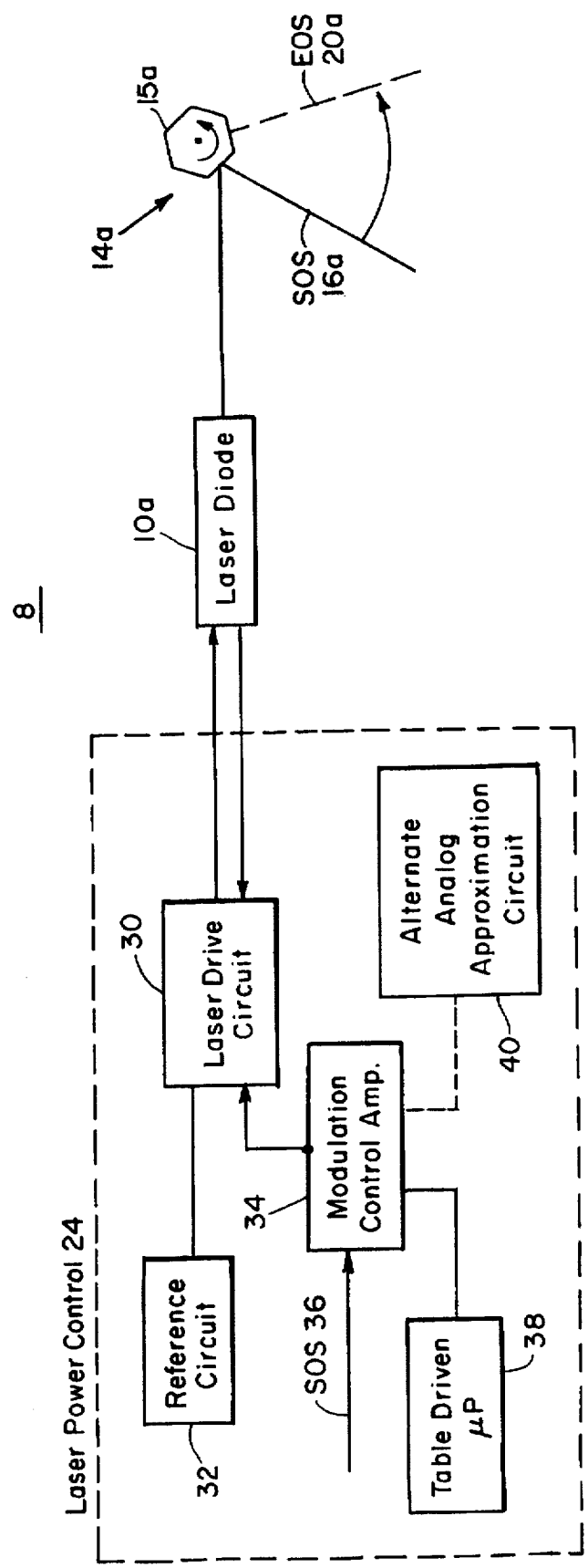
FIG. 2 is a more detailed schematic diagram of the laser power control of FIG. 1.
Figure 3B:
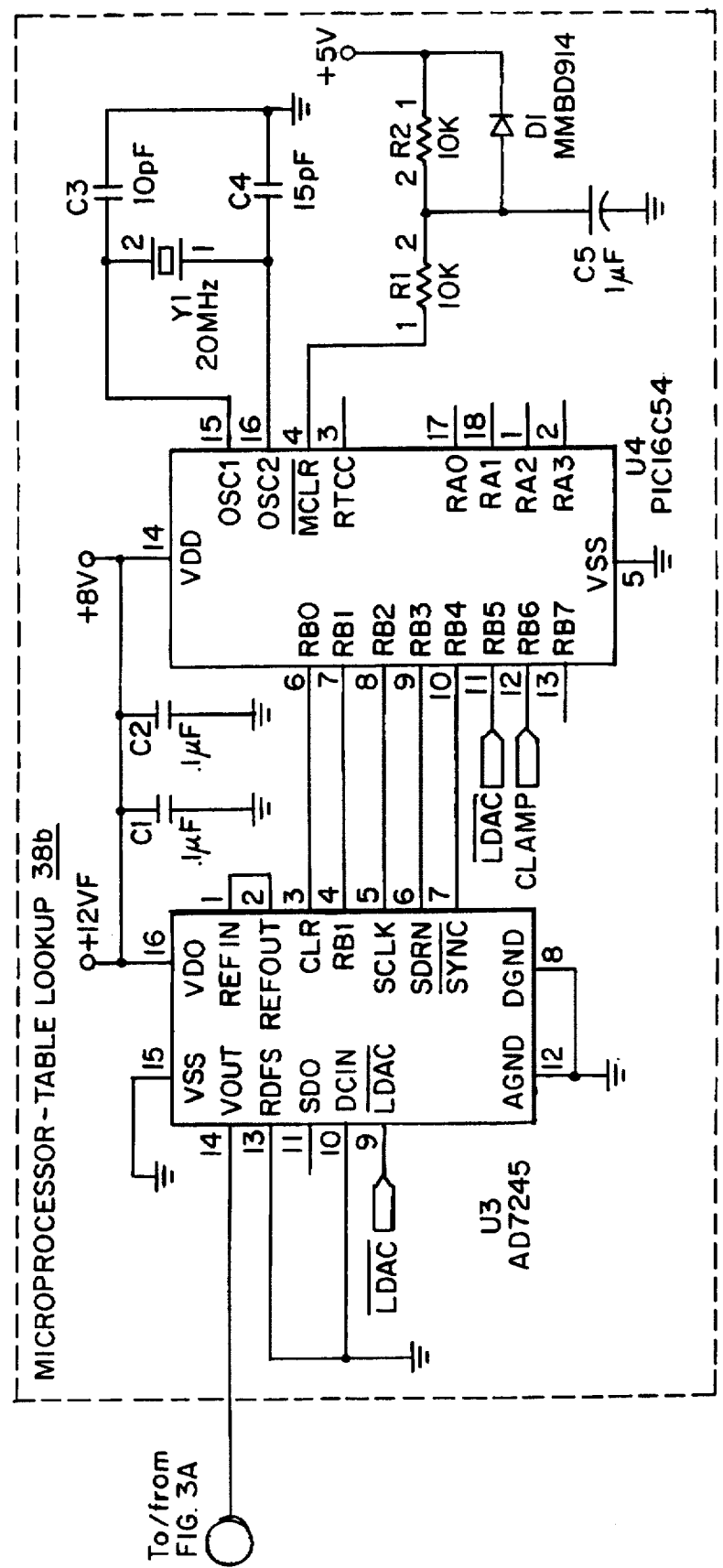
Figure 3C:
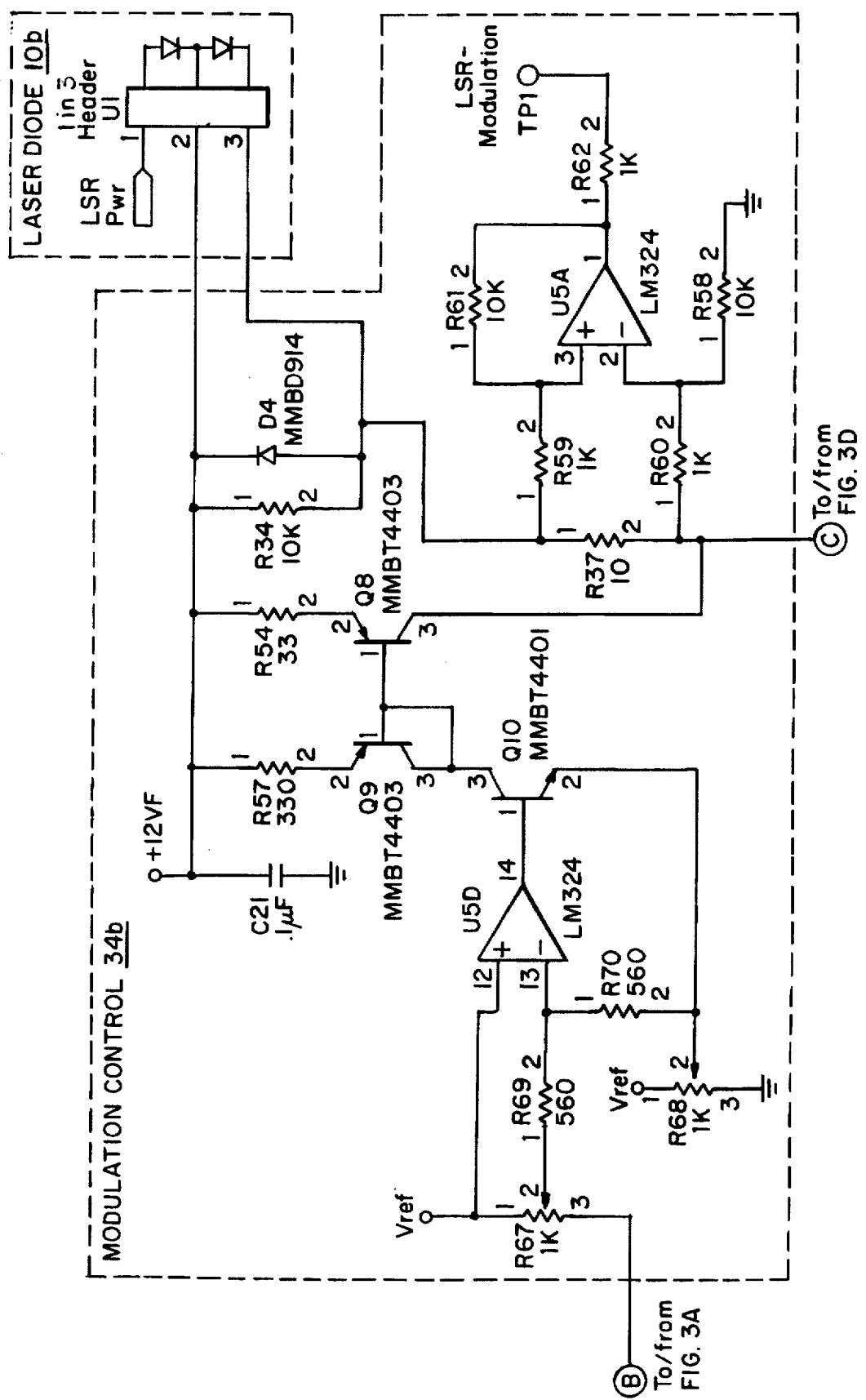
Figure 3D:
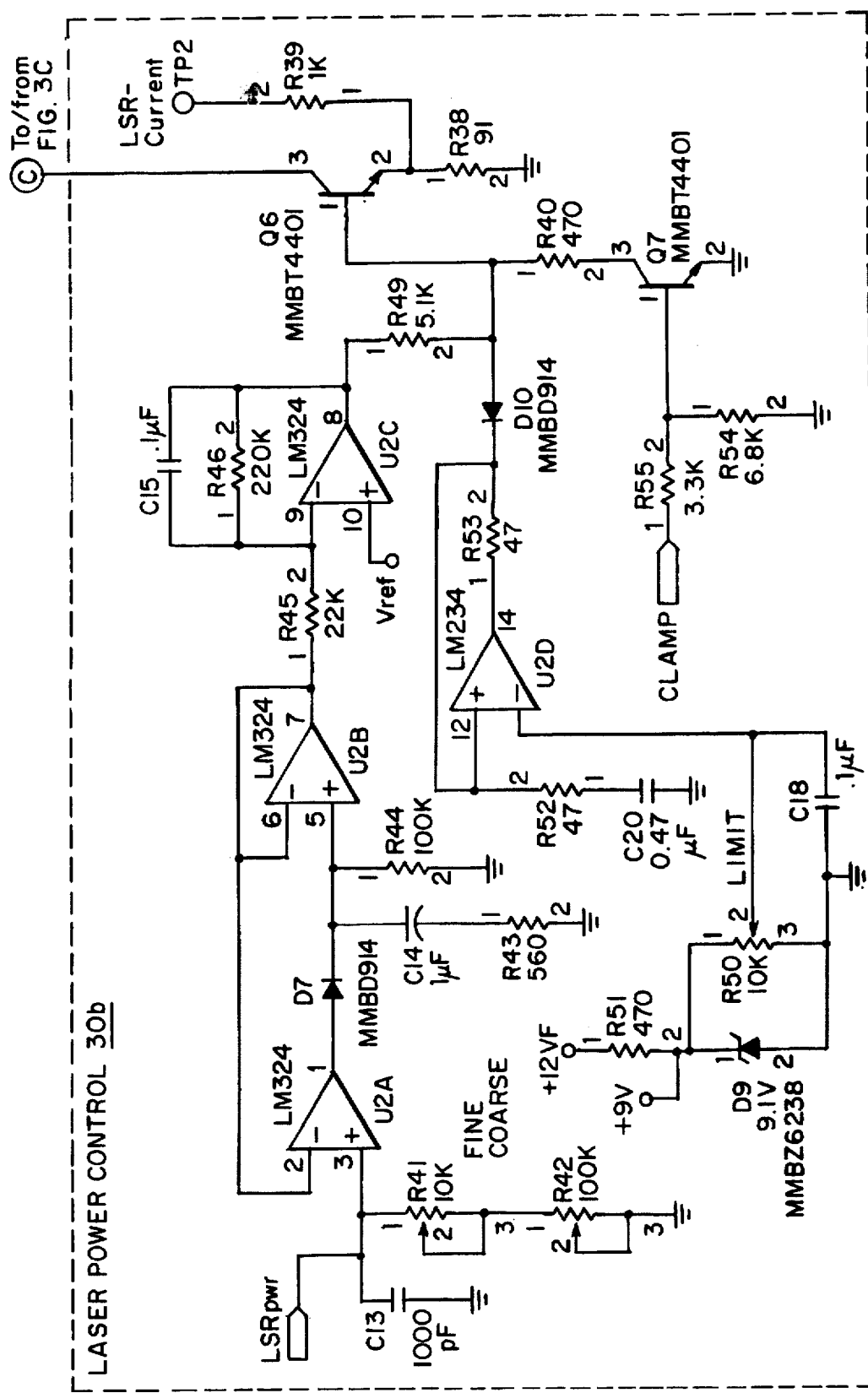

Laser power control 24 is shown in more detail in FIG. 2, where it can be seen that laser 10 is implemented as laser diode 10a driven by laser drive circuit 30 in laser power control 24. Reference circuit 32 also in laser power control 24 provides a quiescent or operating point to normally power laser diode 10a. Modulation control amplifier 34 operates laser drive circuit 30 to increase or decrease the power above and below that commanded by reference circuit 32 beginning with the appearance of the start of scan signal at its input on line 36. The actual operation of modulation control amplifier 34 is controlled by table driven values from microprocessor 38. For example, for the full symmetrical sweep shown in FIG. 1, the power provided to laser diode 10a as the scan moves from start of scan 16 to end of scan 20 would occur as follows.

With the scanner perpendicular to a flat scanning surface, the laser return light is most intense in the middle of the scan, and falls off at the ends. The compensating power modulation is then a parabola, centered on the middle of the scan. This is expressed by the equation:

$$y=a(x-c)^2$$

where y=the laser power, unitless;
x=the distance (time) through the scan;
a=multiplier setting the overall "gain" of the parabola;
c=offset to the middle of the scan.

For creating the modulation waveform, either table lookup or calculation of the equation directly could be used.

The "x" value would be incremented once per step through the scan. The total number of steps in a scan would be determined by the maximum conversion time of the D/A converter, and by the speed of the microprocessor. For example, at 1000 scans/second, or 1 ms scan duration, a step time of 10 µs would yield 100 steps.

The offset "c" is determined to be one half the length of time a scan takes, or 50 in this example.

The multiplier "a" would typically be adjusted so the full scale value of the digital-to-analog conversion (D/A) is reached at the extremes of the scan. For example, a 12-bit converter has full scale value of 4096. When x=0, at the beginning of the scan, y=4096-a-(0-50)$^2$, or a=1.6384.

Sample "y" values would then be as shown in Table I.

TABLE I

| | |
|---|---|
| x = 0 | y = 1.6384(1-50)$^2$ = 4095 |
| x = 1 | y-3933 |
| x = 2 | y = 3774 |
| x = 3 | y = 3619 |
| x = 4 | y = 3466 |
| x = 5 | y = 3317 |
| x = 50 | y = 0 |
| x = 96 | y = 3466 |
| x = 97 | y = 3619 |
| x = 98 | y = 3933 |
| x = 100 | y-4095 |

For the moving mirror scanner 14a in FIG. 2, shown as including a rotating polygonal mirror 15a, the value supplied will be similar to those shown in Table I.

Alternatively to table-driven microprocessor 38, modulation control amp 34 may be operated by analog approximation circuit 40, which for example can implement a parabolic curve to produce the symmetrical power variation useful with the full symmetrical scan shown in FIG. 1.

A full circuit implementation of the system of FIGS. 1 and 2 is shown in FIGS. 3A-D where like parts have been given like numbers accompanied by a lower case b.

Figure 4:
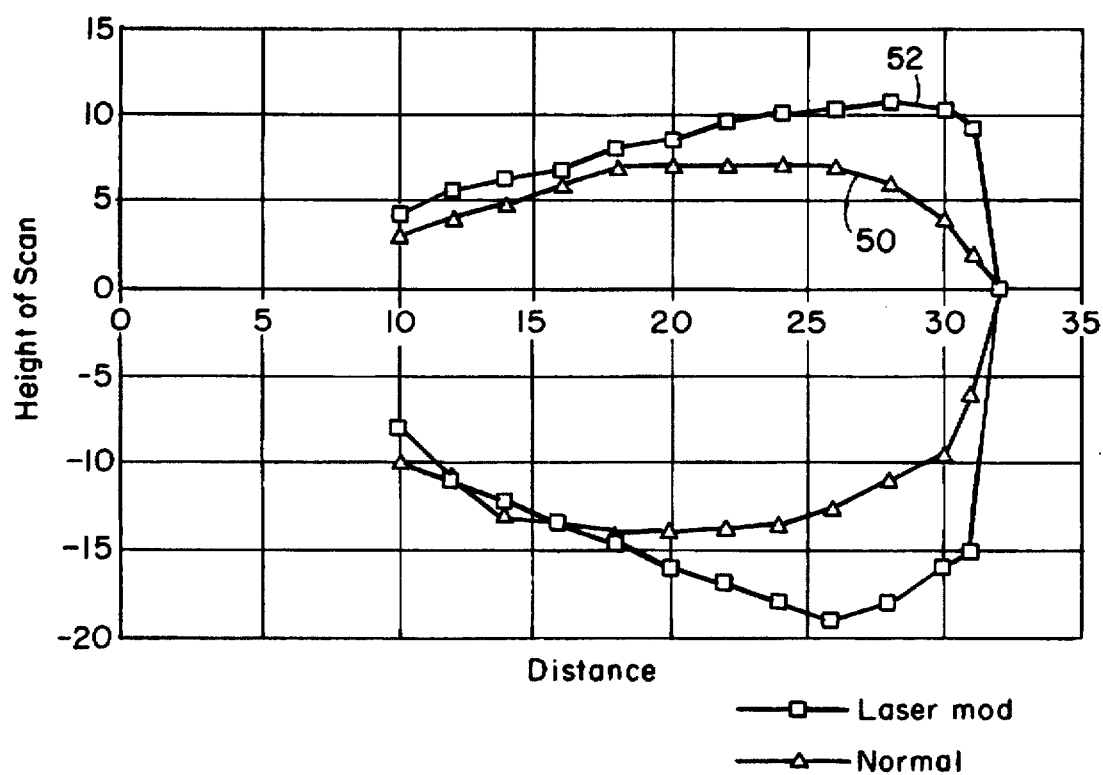
FIG. 4 is a plot showing the enhanced performance area achievable with this invention.

The enhanced performance area achieved by this invention can be seen with respect to FIG. 4, where the height of scan, that is, the length of the scan path, is shown in the ordinate axis and the distance from the scanning device to the box or other object bearing the barcode label is provided along the abscissa axis. There it can be seen that the normal extent of the laser effectiveness, curve 50, in a 30-inch range extends from +4 to −10 inches whereas with the improved laser whose power is modulated according to this invention, curve 52 at the same distance of 30 inches has a height of scan or length of scan that extends from +10 to −16 inches, a marked improvement, giving a larger and more reliable performance area.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An intensity compensated scanning system comprising:

laser means for providing a laser beam;

scanner means for sweeping said laser beam in an arcuate path across a surface to be scanned;

means for sensing the return laser beam reflected from the surface to be scanned;

means for quantifying the decrease in the intensity of the return laser beam at the scan extremity portion relative to the intermediate scan portion; and means, responsive to said means for quantifying, for varying the power to said laser means at the scan extremity portion relative to that at the intermediate scan portion for balancing the intensity of the return laser beam reflected from the surface to the said means for sensing.

2. The intensity compensated scanning system of claim 1 in which said laser means is a laser diode.

3. The intensity compensated scanning system of claim 1 in which said scanner means includes a rotatable polygonal mirror.

4. The intensity compensated scanning system of claim 1 in which said scanner means includes a galvanometer mirror.

5. The intensity compensated scanning system of claim 1 in which said means for quantifying includes storage means for storing correction data for compensating for the difference in intensity of reflection between the extreme and intermediate portions of the scan.

6. The intensity compensated scanning system of claim 1 in which said means for varying includes amplifier means.

* * * * *